United States Patent [19]
Coddington et al.

[11] 3,724,521
[45] Apr. 3, 1973

[54] ANTI-FLAT DEVICE

[75] Inventors: David M. Coddington, Piscataway; William D. Marsh, Cranford; Harvey Cohen, Woodbridge, all of N.J.

[73] Assignee: Esso Research and Engineering Company, Linden, N.J.

[22] Filed: May 6, 1971

[21] Appl. No.: 140,879

[52] U.S. Cl..................................152/340, 152/429
[51] Int. Cl.................................................B60c 17/00
[58] Field of Search................152/340, 313, 341, 429

[56] References Cited

UNITED STATES PATENTS

| | | | |
|---|---|---|---|
| 3,129,743 | 4/1964 | Nonnamaker | 152/341 |
| 3,191,654 | 6/1965 | Anderson et al. | 152/341 |
| 2,713,371 | 7/1955 | King et al. | 152/341 |
| 2,754,876 | 7/1956 | King | 152/341 |
| 3,018,813 | 1/1962 | Koch et al. | 152/341 |
| 3,160,191 | 12/1964 | Anderson | 152/341 |

*Primary Examiner*—Drayton E. Hoffman
*Attorney*—Manahan & Wohlers and F. Donald Paris

[57] ABSTRACT

An anti-flat device for a tubeless pneumatic tire comprising an expandable toroidal air pressure reservoir or small inner tube restrained by a folded and stitched fabric band to prevent the inner tube from filling the tire even though the inner tube is inflated to a higher pressure than that normally employed for the tire. When the air pressure in the tire is reduced below a predetermined value, the band unfolds thereby permitting the inner tube to expand and provide operable support for the tire.

14 Claims, 14 Drawing Figures

PATENTED APR 3 1973 3,724,521

INVENTORS
DAVID M. CODDINGTON
WILLIAM D. MARSH
BY HARVEY COHEN

F. Donald Paris
ATTORNEY

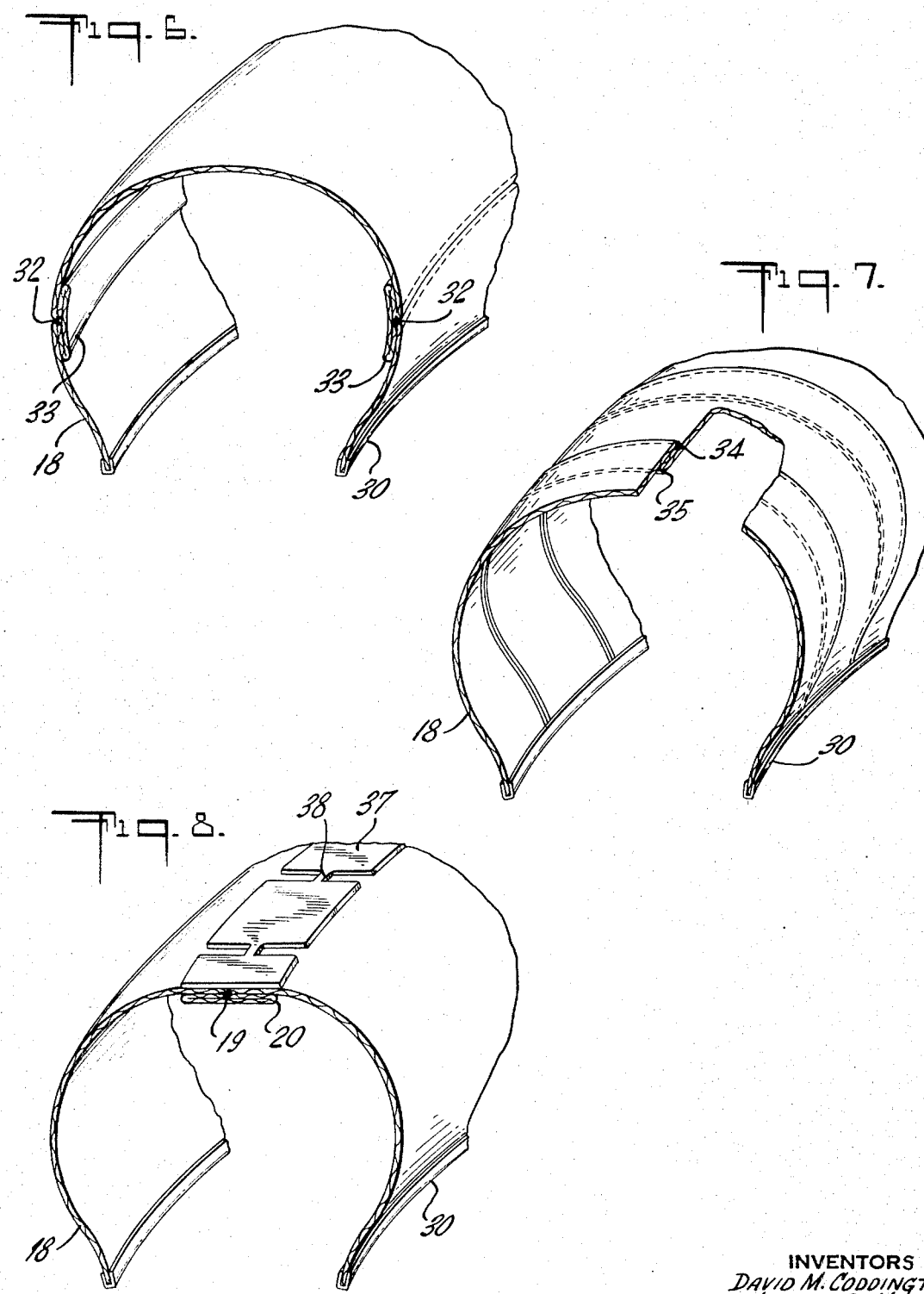

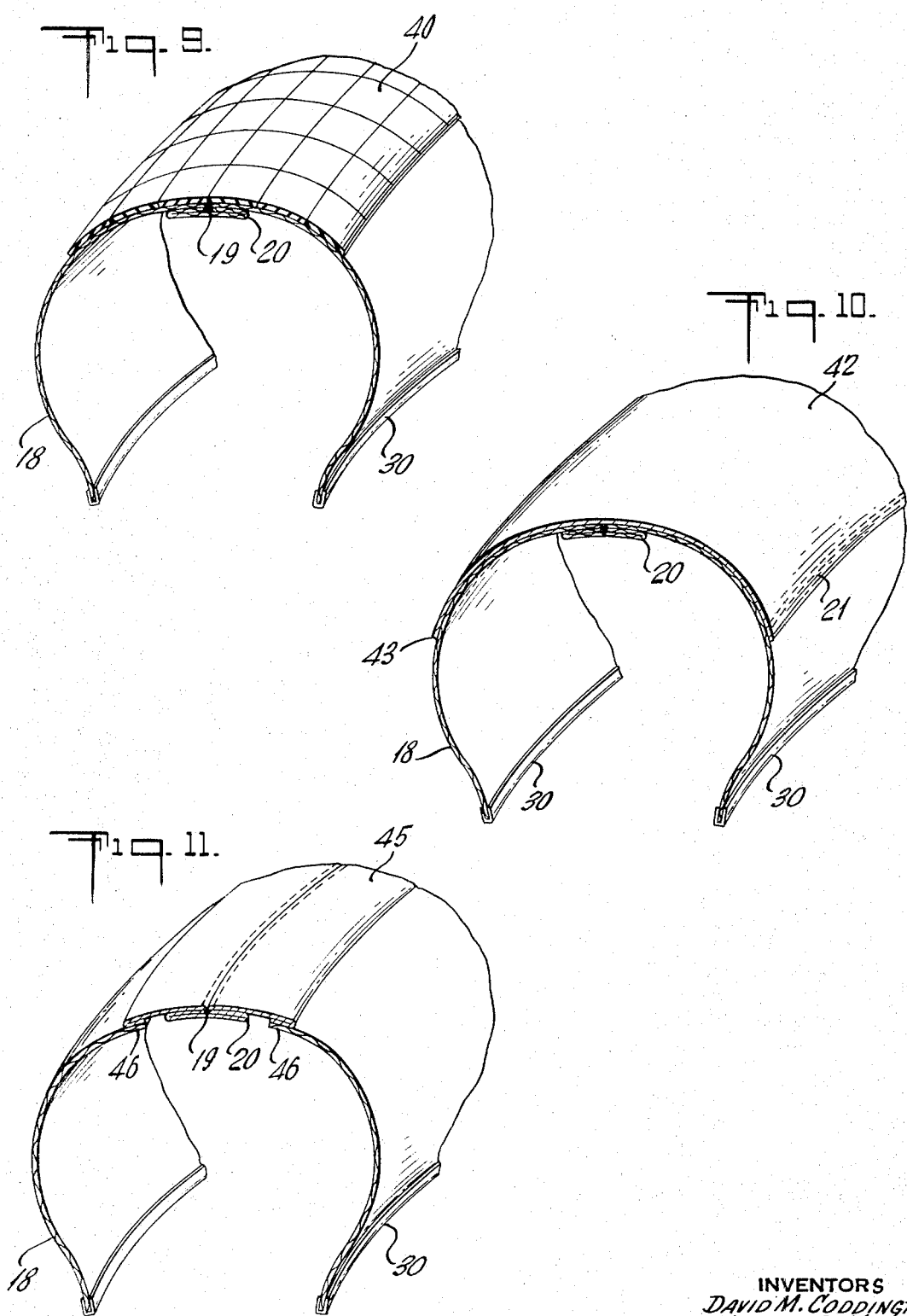

INVENTORS
DAVID M. CODDINGTON
WILLIAM D. MARSH
BY HARVEY COHEN

ATTORNEY 3,724,521

ANTI-FLAT DEVICE

BACKGROUND OF THE INVENTION

Tubeless tires have been in widespread use for a number of years. They have superior blowout resistance but are still subject to a sudden loss of pressure from various causes. Failures at high speed can cause the driver to lose control and lead to damage to the vehicle and injury to its occupants. More gradual air loss, while less likely to result in loss of vehicle control and tire blowout does result in a "flat" or inoperable tire. On-the-spot changing of the "flat" is necessary before the vehicle can continue, but changing a tire may have to be done in hazardous locations. To minimize the risks involved with "flats" and blowouts, it is desirable to have a backup device which will enable the driver to retain control and continue to a repair facility.

Many anti-flat devices have been proposed and are the subject of prior patents. None of the prior art devices have found wide commercial success. Included in the group of prior art devices are those (such as U.S. Pat. No. 3,542,110 and U.S. Pat. No. 2,713,371) which employ a smaller and semi-rigid inner tire which does not in normal operation touch the road tire but which will support the car should the road tire fail. That is, the collapse of the tire when punctured is limited by the inner tire so that the car will remain under the driver's control. A second type of device uses rigid members within the tire (such as German Patent 1,480,948) to support the vehicle should the road tire fail. A third type of anti-flat device uses a flexible inner tire (such as U.S. Pat. No. 3,018,813) to expand and fill the road tire if its air pressure is lost by a puncture. Other proposals have included the use of foam filled inner tires (such as U.S. Pat. No. 3,195,601) and the use of sealant materials to prevent the loss of air pressure when the tire is punctured.

The prior art devices have been subject to a number of problems particularly in mounting and servicing since they may require special mounting and servicing techniques or use of special rims, thereby making repairing or changing tires difficult. Their relatively high cost, approaching that of the tire itself, has limited commercial acceptance. Generally, once one of the prior art devices has been put into service, the ability to run the car thereon is quite limited. Normally the car must be run at reduced speeds to avoid damage to the road tire and early destruction of the inner tire due to heat buildup and abrasion. Thus, the ability of the devices to perform well following the failure of the outer tire has also been a factor limiting their general acceptance by the automobile industry and motorists. The benefits of improved safety would be extended through general acceptance of an anti-flat device.

For an anti-flat device to be universally accepted and used, it must feature low price, simple mounting and servicing, reliability and it must not place serious restrictions on the driver when the anti-flat device is in service. The objective of the present invention is to provide an anti-flat device which will fill the requirements given above which have heretofore not been fully met by the prior art devices.

SUMMARY OF THE INVENTION

The present invention uses an expandable toroidal air pressure reservoir or small inner tube mounted inside the tire as a backup device to expand and support the tire should a failure occur.

The small inner tube is surrounded by a novel fabric restraining band. The band performs several functions. It keeps the inner tube away from the tire in normal operation and it provides controlled expansion of the tube to fill the tire in the event of air pressure loss. In the expanded condition, the inner tube supports the tire load at a reduced, but serviceable, pressure (10 psi or higher). The fabric band prevents extrusion of the tube out through any hole in the tire associated with its air pressure loss. The volume restraint/expansion feature of the band is provided by folds secured by rip seams which part only when a predetermined pressure differential is exceeded. The band itself, or through added protective means, serves to protect the tube from injury by intruding objects, i.e., nails, etc.

The details of the construction of the restraining band are more clearly seen from the drawings and will be described fully in the following detailed description of the preferred embodiments.

BRIEF DESCRIPTION OF THE DRAWINGS

The drawings show the preferred embodiments of the invention.

FIG. 6 is a perspective view of a section of another embodiment of the restaining band differing from FIG. 3 in that folds are made along the sides of the restraining band.

FIG. 7 is still another perspective view of a third embodiment of the restraining band in its folded condition.

FIG. 8 is the restraining band of FIG. 3, with the addition of a strap used to flatten the shape of the restraining band.

FIG. 9 shows a perspective view of the restraining band of FIG. 3 with the addition of an overlay of heavy protective rubber.

FIG. 10 shows a perspective view of the restraining band of FIG. 3 with the addition of an overlay of heavier fabric to protect the restaining band from abrasion or puncture after the restraining band has been released.

FIG. 11 is still another perspective view of a variation of the restraining band of FIG. 3 having a heavier protective fabric section inserted into the top of the restraining band.

DESCRIPTION OF THE PREFERRED EMBODIMENTS

Figure 1:
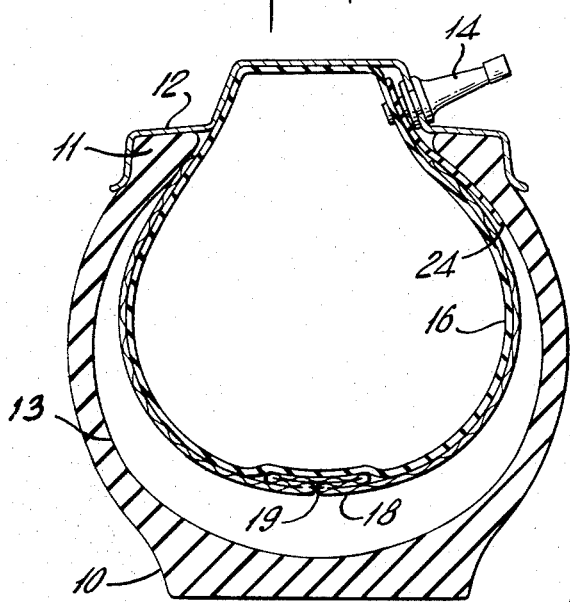
FIG. 1 is an overall view of the anti-flat device positioned in a tire in its normal running configuration.
Figure 2:
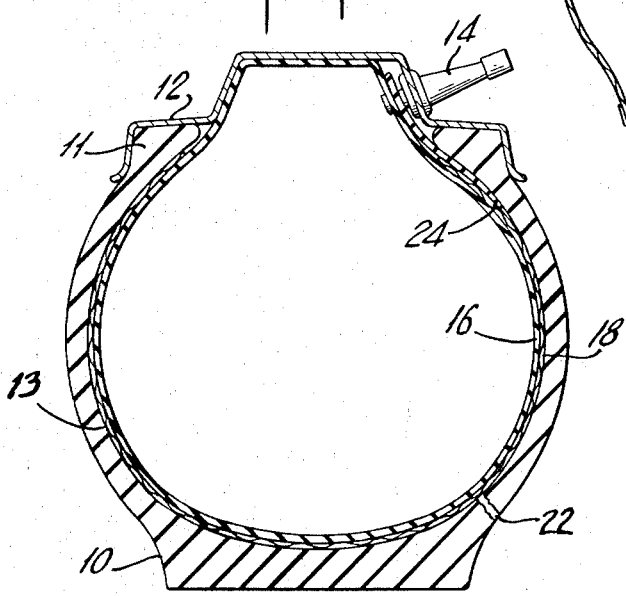
FIG. 2 shows the anti-flat device fully expanded to support a tire from which air pressure has been lost.

The principle of the operation of the present invention may be seen by simultaneous reference to FIGS. 1 and 2. FIG. 1 and 2 have the same basic elements disposed in their normal and emergency positions respectively. The outer tire 10 is mounted on a rim 12 having a dual inflation valve 14 mounted thereon including an extension piece 24. The anti-flat device consists of an expandable toroidal air pressure reservoir 16 (hereinafter referred to as an inner tube), surrounded by and restrained by a band 18 made of fabric or other relatively inextensible material. The band 18 is reduced in size by folding and stitching. In FIG. 1 the restraining band 18 prevents the inner tube 16 from expanding to fill the tire 10. In this condition the inner tube 16 is inflated to a higher pressure than exists in the tire 10, typically by 1 to 10 psi. The pressure in a passenger car tire, for example, would normally be approximately 24 to 26 psig. When restrained, the inner tube 16 does not contact the tire 10 except in the area of the beads 11. The restraining band 18 is held between the tube 16 and the tire 10 at the beads 11. For convenient mounting, the restraining band 18 may be attached to the inner tube 16 at this point. In addition, the reinforced edge 30 of the restraining band, which can be seen more clearly in FIG. 3 and other figures which follow, is inextensible and prevents the edge of the restraining band from pulling out of the area of the beads 11 when the inner tube 16 is inflated. Since the band 18 and the inner tube 16 do not touch the tire walls, they are not affected by the flexing of the tire wall which occurs during normal operation. The tube 16 and the restraining band 18, although present within the tire 10, are effectively isolated therefrom during normal operation. In FIG. 2 there is shown the consequence of a puncture represented schematically by opening 22. Such an opening would release the previously mentioned 24 to 26 psig air pressure in the tire 10, thereby creating a high pressure differential between the inner tube 16 and restraining band 18 and the tire 10. The consequence of such a change in differential pressure from about 1 – 10 psi to 25 – 30 psi is to cause an opening of the rip seam stitching 19 (see FIG. 3) of the restraining band 18 which releases the inner tube 16 so that it expands fully against the inner surface 13 of the tire 10, supporting it with a residual (after expansion) pressure of approximately 10 to 12 psig. Typically, the release of the stitching 19 takes place when the pressure differential reaches 10 psi or higher. It will be understood that although controlled release stitching is referred to for illustration, that other controlled release means could be used, e.g. adhesive bonding or fabric strips designed to interlock fibers to form a closure and which release when subjected to a predetermined stress per unit length. The restraining band 18 in its fully open position will conform to the inner surface 13 of the tire 10 and protect the inner tube 16 from abrasion due to the intrusion of foreign materials. The restraining band 18 will also support the tube 16 in case of a tire rupture and prevent it from protruding into the opening created by the rupture and causing it to fail.

The inner tube 16 may be made of any number of suitable materials, particularly butyl rubber which is normally used in similar tubes because of its low air permeability, but also other rubbers such as chlorobutyl, bromobutyl, SBR, IR, natural rubber, ethylene propylene, ethylene-propylene-diene, neoprene and nitrile, and blends thereof.

The restraining band 18 is made of a pliable material, normally a woven fabric, but others could be used such as nonwoven fabrics, plastic sheet, and rubber or laminated combinations of such materials.

Figure 3:
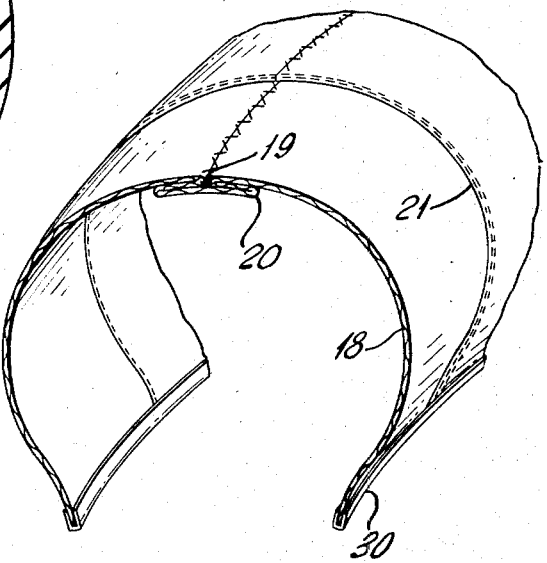
FIG. 3 shows a perspective view of a portion of the restraining band when in its normal running configuration but without the inner tube which has been deleted for purposes of clarity in the illustration.

Having seen the operation of the anti-flat device, reference is made to FIGS. 3 through 11 wherein various details and embodiments thereof are shown. One preferred embodiment is shown in FIG. 3 in which the restraining band 18 is shown in a perspective view without the tire 10 and the inner tube 16. The webbing or inextensible reinforced edge 30 is shown which is used to keep the restraining bands in place against the tire adjacent to the rim. In this configuration the restraining band 18 is reduced in diameter by making a single circumferential fold with the excess material 20 turned inside the band 18 and stitched circumferentially 19. The stitching 21 passing radially between the reinforced edges 30 is permanent stitching needed in fabricating the toroidal shape and does not open when the restraining band 18 becomes subjected to a high differential pressure. Under such circumstances the stitching 19 ruptures preferentially so that the main circumferential fold 20 opens radially to allow the restraining band 18 to move out against the tire wall 13 as required by the expansion of the inner tube 16.

Figure 4:
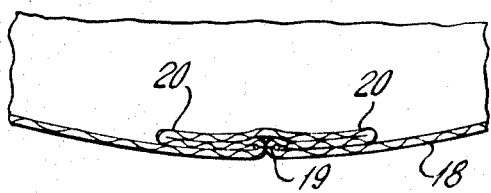
FIG. 4 is an enlarged portion of a section of FIG. 3 illustrating the folds and stitching of the restraining band when in the normal configuration of FIG. 1.

FIG. 4 shows an expanded view of the fold 20 and the stitching 19 taken from FIGS. 1 and 3, which better illustrates the method by which the restraining band is restricted in cross section under the normal operation of the tire.

In order to make possible the operation of the dual pressure system of FIG. 1, is is necessary to have a valve which can inflate the inner tube 16 and the tire 10 to different pressures. This is accomplished by a dual inflation valve 14 which includes the extension piece 24 shown in FIG. 5. A number of such valves are disclosed in the prior art (for example, in U.S. Pat. No. 3,542,110).

Figure 5:
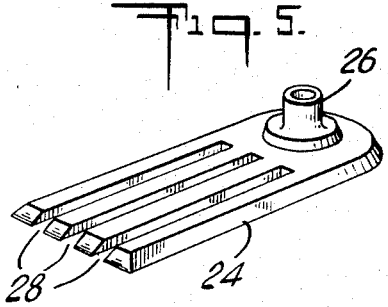
FIG. 5 is an extension piece of the dual inflation valve which permits air to pass into the space between the restraining band and the outer tire.

FIG. 5 shows the extension piece 24 which is connected by the tubular portion 26 to the valve 14. Air passing through valve 14 is released at extension piece 24 and passes through slots 28 located between the tire 10 and the restraining band 18 at the tire's beads 11. The extension piece 24 is shown in both FIGS. 1 and 2 in its normal position. The valve 14 is constructed to introduce air into the inner tube 16 as well as to the space between the interior wall 13 and the band 18 by extension piece 24.

A variation of the restraining band of FIG. 3 is shown in FIG. 6. The circumferential stitching 19 of FIG. 3 has been repositioned and shown as two side folds 33 being stitched along 32 with a rip seam. In this configuration there is no need for the outer circumferential stitch 19 shown in FIG. 3.

FIG. 7 shows still another embodiment in which the restraining band 18 has been pleated in the radial direction between the reinforced edges 30 in order to reduce the circumferential diameter of the restraining band. In this embodiment there are multiple rip seams 34 which are located radially in addition to permanent seams (not shown). The excess material 35 is folded inside the restraining band. Again, when subjected to high differential pressure the rip seams 34 will open and the folds 35 will be released allowing the restraining band to expand and fill completely the cavity of the outer tire 10.

FIG. 8 shows a perspective view of the restraining band of FIG. 3 to which an additional strap 37 has been added around the outermost circumference of the restraining band 18 located directly over the rip seam 19 and its associated folds 20. The purpose of the additional strap 37 is to reduce the circumference of the restraining band 18 and make possible a flatter crown area than is normally possible with the circumferential folding which tends to provide a circular cross section. The flattening of the crown area on which the restraining strap 37 is located assures that the restraining band 18 remains at a satisfactory distance away from the outer tire to prevent abrasion of the tube and the restraining band when the tire is subjected to severe shocks which distort its cross-sectional shape. The restriction of the crown area also makes it less likely that any foreign object protruding through the tire will reach the inner restraining band 18 and damage it. A feature of such a restraining strap is the provision of a narrow neck section 38 which will have known fracture properties and will thus insure that when the anti-flat device is subjected to high differential pressures that the strap 37 will fail as well as the normal rip seam 19.

FIG. 9 shows a perspective view of the restraining band of FIG. 3 to which has been added overlay 40 to reinforce the restraining band 18 against damage. The protective overlay 40 is shown completely surrounding the crown portion of the restraining band 18 and would be permanently bonded at its outer edges. Inasmuch as such an overlay must be extensible, it would normally be made of a rubber material.

FIG. 10 shows still another embodiment; an inextensible protective flap 42 has been added to the restraining band of FIG. 3 and attached by a permanent seam 21 to the restraining band 18. The opposite side of the reinforcement 42 is stitched to the restraining band 18 with a rip seam 43. The reinforcing flap 42 could be made of heavier fabric than the restraining band or made of rubber or plastic sheet material, or any number of similar materials which would provide additional protection against abrasion and damage to the reinforcing band 18. In order for the reinforcing flap 42 to perform its function, its rip seam 43 should fail at approximately the same stress as the rip seam 19 shown in the previous drawings, i.e., when the differential pressure between the inner tube 16 and the outer tire 10 reaches approximately 10 psi or higher. When seam 43 opens, the restaining band 18 unfolds in its usual fashion, the reinforcing flap 42 then covering the crown area of the restraining band as it is positioned against the outer portion of the tire 10. The folds 20 would not be stitched together since the rip seam 43 would replace the function of seam 19 in the other drawings.

Still another means of providing additional protection for the restraining band against the intrusion of foreign materials through the outer tire 10 is shown in FIG. 11. The reinforcing flap of FIG. 10 has been incorporated directly as a portion of the restraining band, being shown with folds 20 and rip seam 19 as with the normal arrangement of FIG. 3 in which the reinforcing band is of a continuous material. The reinforcing section 45 of FIG. 11 is permanently attached to the normal restraining band along lines 46 in the crown area of the reinforcing band 18. As in the previous configurations, when the differential pressure reaches the desired range, normally 10 to 12 psi, the rip seam 19 will open unfolding the reinforcing band 18. The especially heavy reinforced area 45 will then be positioned against the crown area of the tire.

Figure 12:
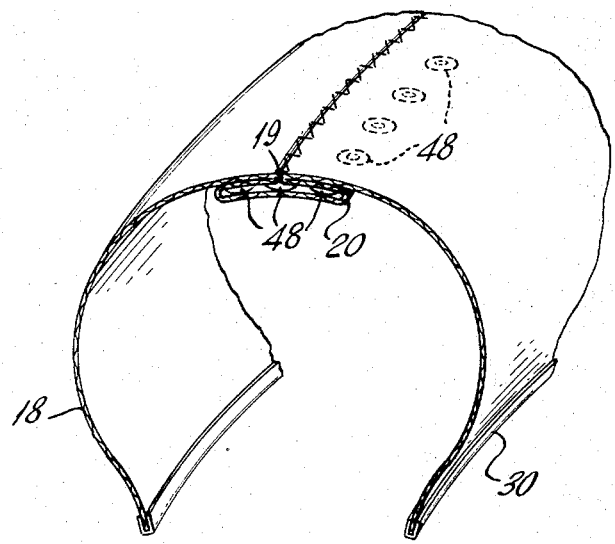
FIG. 12 is a perspective view of another embodiment of the invention in which the restraining band is not as large as the inner surface of the tire and has stand-off supports mounted on the crown area, thus allowing the band in its expanded condition (FIG. 13) to maintain the tire in its normal shape. The crown area including the supports is folded inside the band in the normal running configuration shown.
Figure 13:
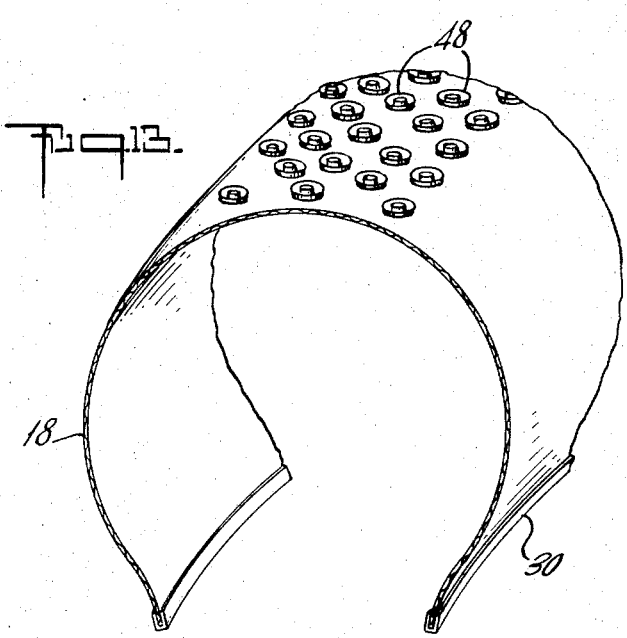
FIG. 13 shows the restraining band of FIG. 12 in its expanded form with the stand-off supports in the crown area.

FIGS. 12 and 13 show a band 18 similar to those previously disclosed, but having rows of standoff supports attached to the crown area of the band. Band 18 is made smaller in size than heretofore and folded 20 and stitched 19 in a similar manner. As it is smaller, even when expanded (FIG. 13), the band 18 does not touch the crown area of the tire in which it is mounted. This prevents intruding objects, e.g., nails, from reaching the band 18 and inner tube 16. The standoff supports permit the inner tube to support the tire without the band 18 being in direct contact with it.

Figure 14:
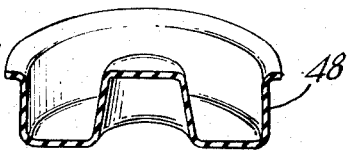
FIG. 14 shows a cutaway view of one typical stand-off support.

Various types of standoff supports could be used. A typical embodiment is shown in FIG. 14.

The invention as described hereinabove may take many forms in its practical application, a number of which have been shown in the foregoing figures. Several of these are described and shown herein, but it should be recognized that the invention may take a number of other forms which are not specifically disclosed herein without violating the spirit of the invention. The invention is set forth more completely in the claims below.

What is claimed is:

1. An anti-flat device for a tubeless tire comprising:
   a. an expandable toroidal air pressure reservoir positioned inside the tire;
   b. means for inflating said toroidal air reservoir to an air pressure greater than that of the tire;
   c. means for restraining expansion of said toroidal air reservoir by the air pressure differential between said reservoir and the tire thereby preventing the air reservoir from touching the tire wall during normal operation of the tire and controlling its shape, said restraining means being a pliable material conformed to the shape and size of the inner surface of the tire which is folded and secured to create a restraining band of smaller size than said inner surface;
   d. means for releasing said reservoir restraining means when a predetermined amount of the air pressure in the tire is lost thereby permitting said toroidal air reservoir to expand and fill said tire.

2. The anti-flat device of claim 1 wherein the means for inflating the toroidal air reservoir is a valve disposed such that it can discharge air into either the toroidal air reservoir or the tire.

3. The anti-flat device of claim 1 wherein the means for releasing said restraining means includes stitching of the folds in the pliable material characterized by failure when subjected to a predetermined pressure differential.

4. The anti-flat device of claim 1 wherein the means for releasing said restraining means is adhesive bonding of the folds in the pliable material characterized by failure when subjected to a predetermined pressure differential.

5. The anti-flat device of claim 1 wherein the means for releasing said restraining means is a fabric fastening device comprising a multiplicity of interlocking fibers which release when subjected to a predetermined stress per unit length.

6. An anti-flat device in combination with a tubeless tire of the type having annular beads on the inner edges to facilitate mounting on a wheel rim comprising:
   a. an expandable toroidal air pressure reservoir positioned inside the tire;
   b. a valve for inflating said toroidal air reservoir to an air pressure at least equal to that of the tire;
   c. a restraining band conforming to the size and shape of the inner surface of the tire, said band being folded and secured by stitching to a smaller size than the inner surface of the tire and anchored between said beads and said reservoir;
   d. stitching of said restraining band folds being characterized by the release of said restraining band when the air pressure inside said toroidal air reservoir exceeds that in the tire by a predetermined amount.

7. The anti-flat device of claim 6 wherein the expandable toroidal air reservoir is fabricated of a rubbery material from the group consisting of butyl, chlorobutyl, bromobutyl SBR, IR, natural rubber, ethylene-propylene, ethylene-propylene-diene, neoprene and nitrile, and blends thereof.

8. The anti-flat device of claim 6 wherein the restraining band is made of a pliable material selected from the group consisting of woven fabrics, non-woven fabrics, plastic sheet, and rubber or laminate combinations thereof.

9. The anti-flat device of claim 6 wherein the folds of said restraining band are disposed circumferentially about the axis of rotation of the tire.

10. The anti-flat device of claim 6 wherein the folds of said restraining band are disposed radially to the tire and in spaced relation, along the circumference of the band.

11. The anti-flat device of claim 6 wherein a supporting strap is secured around the circumference of said restraining band, thereby flattening the crown area of the restraining band.

12. The anti-flat device of claim 6 wherein an outer reinforcement is placed around the circumference of said restraining band thereby providing additional protection for said toroidal air reservoir.

13. The anti-flat device of claim 6 wherein said restraining band has reinforced edges positioned between the toroidal air reservoir and the tire beads.

14. An anti-flat device in combination with a tubeless tire of the type having annular beads on the inner edges to facilitate mounting on a wheel rim comprising:
   a. an expandable toroidal air pressure reservoir positioned inside the tire;
   b. a valve for inflating said toroidal air reservoir to an air pressure at least equal to that of the tire;
   c. a restraining band smaller than the inner surface of the tire, said band being folded to a smaller size than the tire and anchored between said beads and said air reservoir and having stand-off supports secured to the crown area;
   d. stitching of said restraining band folds being characterized by the release of said restraining band when the air pressure inside said toroidal air reservoir exceeds that in the tire by a predetermined amount.

* * * * *